R. THEUERKAUF.
JOINING FURS.
APPLICATION FILED MAR. 25, 1909.
931,235.
Patented Aug. 17, 1909.
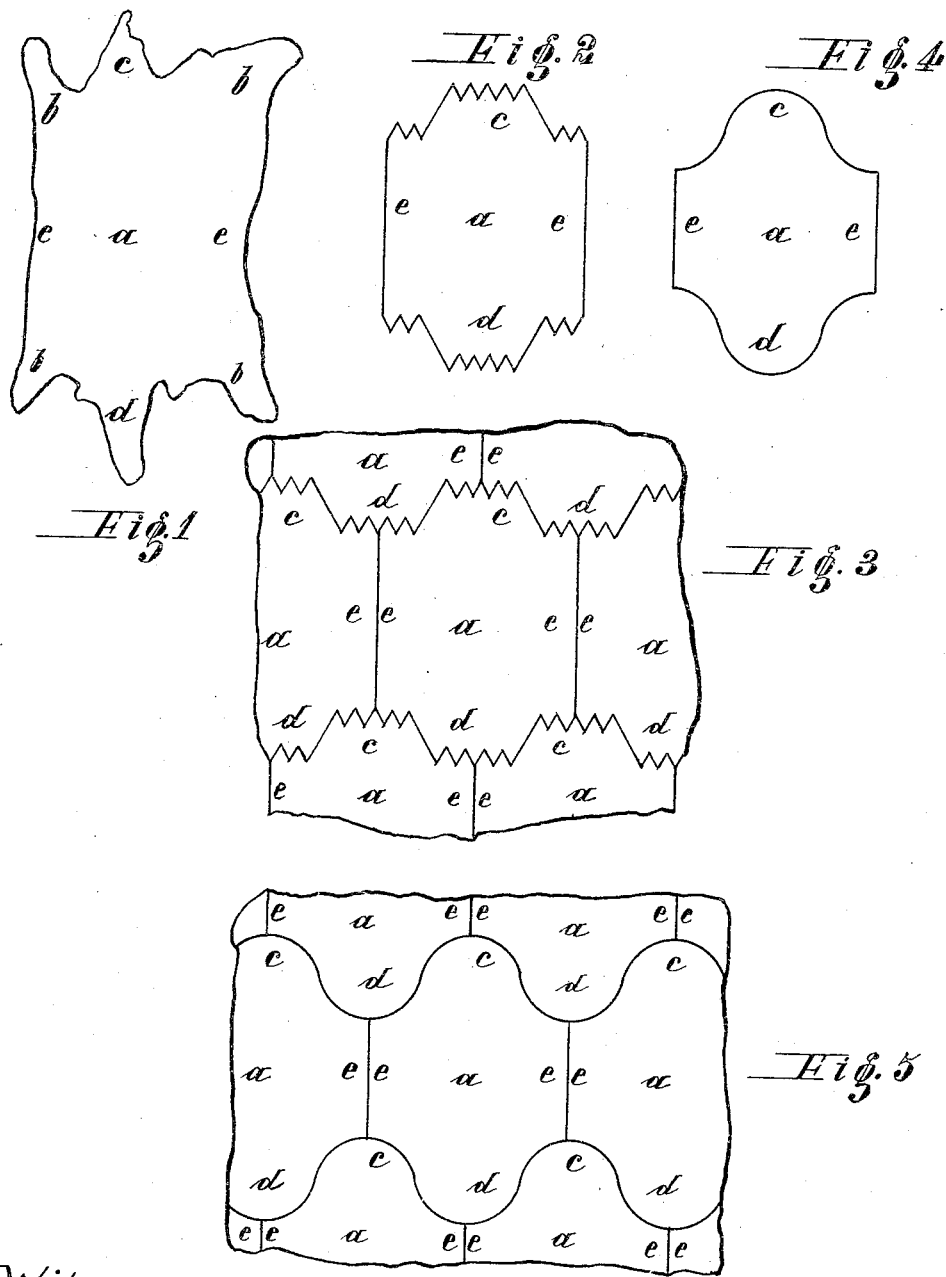

UNITED STATES PATENT OFFICE.

REINHOLD THEUERKAUF, OF LEIPZIG-GOHLIS, GERMANY.

JOINING FURS.

No. 931,235. Specification of Letters Patent. Patented Aug. 17, 1909.

Application filed March 25, 1909. Serial No. 485,694.

*To all whom it may concern:*

Be it known that I, REINHOLD THEUER-KAUF, a subject of the German Emperor, residing at Leipzig-Gohlis, in Germany, have invented certain new and useful Improvements in Joining Furs, of which the following is a specification.

This invention relates to the manufacture of composite pieces of fur, that is to say of pieces made up by uniting the skins of several animals, and one object of the invention is to more completely utilize the skins and obtain wider strips than heretofore, with skins of a given size.

Another object is to reduce the amount of sewing required, and a still further object is to obtain more uniform composite pieces of fur.

Heretofore it has been usual to cut away the less densely haired paw pieces by means of right-angled or obtuse-angled cuts at the four corners of the skin. The two lateral parts of the skin, originally covering the underbody of the animal, were then cut off and each divided into two triangular pieces by means of a diagonal cut. The triangular pieces or tongues were then sewed to the skin to produce an approximately rectangular piece, which was considerably narrower than the original skin owing to the transposition of the triangular pieces. The seams largely destroyed the uniformity of the fur. These disadvantages are obviated by the present invention, which will now be described with reference to the accompanying drawing in which—

Figure 1 is a plan-view of a skin, before cutting, and Fig. 2 a plan-view of the same skin after cutting. Fig. 3 shows a composite piece made up of skins cut as represented in Fig. 2. Fig. 4 shows a slight modification of the manner of cutting and Fig. 5 a piece made up of skins cut as shown in Fig. 4.

Referring to Fig. 1, the skin *a* has four paw or quarter pieces *b* a head or neck piece *c* and butt or tail piece *d*. The sides are marked *e*. In Fig. 2 the skin is shown with the parts *b* cut away and the parts *c* and *d* trimmed to form projections which are of twice the width of each of the gaps made by cutting away the parts *b*. Skins cut in this manner are joined together as shown in Fig. 3, with the parts *c* and *d* fitted into the gaps due to the removal of the paw-pieces of contiguous skins.

In Figs. 4 and 5 the front and rear of the skin are given rounded edges instead of serrated edges as in Fig. 2.

The uniformity of the composite pieces of fur produced in the manner described renders the same very suitable for the manufacture of articles in imitation of more valuable furs.

What I claim as my invention and desire to secure by Letters Patent of the United States is:—

1. A method of cutting furs for joining purposes consisting in removing so much of the paw-pieces and of the head and tail pieces that the non-removed head and tail projections coincide in form with the recess formed by the removal of two paw-pieces.

2. A method of cutting furs for joining purposes consisting in removing the paw-pieces and parts of the head and tail pieces in such manner that a row of juxtaposed cut furs will coincide at its edge with a similar row of juxtaposed furs, the projecting portions of each entering the recessed portions of the other.

In witness whereof I have signed this specification in the presence of two witnesses.

REINHOLD THEUERKAUF.

Witnesses:
 HERM. SACK,
 RUDOLPH FRICKE.